(12) United States Patent
Fisher et al.

(10) Patent No.: US 9,553,842 B1
(45) Date of Patent: *Jan. 24, 2017

(54) METHOD AND APPARATUS OF PROCESSING SOCIAL NETWORKING-BASED USER INPUT INFORMATION

(71) Applicant: West Corporation, Omaha, NE (US)

(72) Inventors: Aaron Scott Fisher, Omaha, NE (US); Bruce Pollock, Omaha, NE (US); Silke Witt-ehsani, Sunnyvale, CA (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,601

(22) Filed: Feb. 2, 2016

Related U.S. Application Data (63) Continuation of application No. 14/547,845, filed on Nov. 19, 2014, now Pat. No. 9,253,139.

(51) Int. Cl.
| | |
|---|---|
| *G06F 15/16* | (2006.01) |
| *H04L 12/58* | (2006.01) |
| *H04L 29/08* | (2006.01) |
| *G06F 17/27* | (2006.01) |
| *H04M 3/51* | (2006.01) |

(52) U.S. Cl.
CPC ............ *H04L 51/32* (2013.01); *G06F 17/278* (2013.01); *G06F 17/2715* (2013.01); *G06F 17/2785* (2013.01); *H04L 67/02* (2013.01); *H04M 3/5191* (2013.01)

(58) Field of Classification Search
CPC ................... H04M 3/5191; H04M 2203/4509
USPC .. 709/204–207, 223–224; 705/319; 715/751, 715/753, 758
See application file for complete search history.

(56) References Cited

U.S. PATENT DOCUMENTS

| | | | | |
|---|---|---|---|---|
| 8,224,642 | B2 * | 7/2012 | Goswami | G06F 17/275 704/1 |
| 8,290,926 | B2 * | 10/2012 | Ozzie | G06F 17/3089 707/708 |
| 8,918,468 | B1 * | 12/2014 | Fisher | H04M 3/5191 709/206 |
| 9,253,139 | B1 * | 2/2016 | Fisher | H04M 3/5191 |
| 2011/0320715 | A1 * | 12/2011 | Ickman | G06Q 30/02 707/748 |

* cited by examiner

*Primary Examiner* — Bharat N Barot
(74) *Attorney, Agent, or Firm* — Raffi Gostanian (57) ABSTRACT

A method and apparatus of processing communications with end users are disclosed. One example method may include detecting a message or post on a website over the Internet that matches a monitoring company's keywords or rules and processing the message by parsing the message and performing a natural language interpretation of the message and processing the parsed message to determine the user's topic of interest. In response, the method may further provide generating a response to the message based on the user's requested objective and sending the response to the user acknowledging the user's topic of interest. Live agents may be notified to check the status of a message and continually override automated message responses to ensure the integrity of the responses.

20 Claims, 7 Drawing Sheets

METHOD AND APPARATUS OF PROCESSING SOCIAL NETWORKING-BASED USER INPUT INFORMATION

CROSS-REFERENCE TO RELATED APPLICATIONS

This application is a continuation from U.S. patent application Ser. No. 14/547,845, filed Nov. 19, 2014, and entitled "METHOD AND APPARATUS OF PROCESSING SOCIAL NETWORKING-BASED USER INPUT INFORMATION", which is a continuation of U.S. patent application Ser. No. 13/185,555, filed Jul. 19, 2011, and entitled "METHOD AND APPARATUS OF PROCESSING SOCIAL NETWORKING-BASED USER INPUT INFORMATION", now issued U.S. Pat. No. 8,918,468, each of which is incorporated by reference herein in its entirety.

TECHNICAL FIELD OF THE INVENTION

This invention relates to a method and apparatus of processing user input information, such as free format and/or unconstrained information, and, more particularly, to obtaining service-based information from social networking information sources and processing the input information for response purposes.

BACKGROUND OF THE INVENTION

Consumers are increasingly using social networking applications to express their thoughts, opinions, sentiments and enquiries. Electronic devices, such as personal digital assistants (PDAs) mobile telephones and other Internet connectivity devices ("mobile stations") provide users with mobile access to these social network sites and other information resources. For instance, a user may be traveling along a highway, waiting for a train or plane, etc., and may be able to communicate with online resources, institutions, and other users at the click of a button.

In addition to the increased availability of a mobile station, certain communication protocols and procedures are becoming increasingly popular and easy to implement, such as, text messaging, which may use short messaging service (SMS), multimedia messaging service (MMS), instant messaging (IM) and/or any other free format text application.

The growing number of mobile devices and increased use of social media networks in society (e.g., Facebook® posts, Twitter® posts, Linked-In® posts via short messaging service (SMS), instant messaging (IM), chat, etc.) and the decreased use of voice to interact with companies, and other service-oriented organizations creates an increased demand to provide text-based monitoring and message creation services. For example, contact centers and contact center agents require automated tools to monitor and respond to social network postings and other related consumer activities. Also, contact centers need to increase their own productivity with processing customer related concerns. Natural language processing and word parsing technology provides tools for a call center agent to monitor and handle multiple responses at one time.

SUMMARY OF THE INVENTION

One embodiment of the present invention may include a method of processing a message originated from an end user. The method may include detecting a message posted on a website data source from the end user, the message posting being related to a predefined monitored entity. The method may also include parsing the message contents and performing a natural language interpretation of the message contents, processing the parsed message to determine the user's topic of interest, generating a response to the message responsive to the user's topic of interest, and sending the response to the end user acknowledging the user's topic of interest.

Another example embodiment of the present invention may include an apparatus configured to process a message from an end user. The apparatus may include a message monitoring engine configured to monitor and detect a message posted on a website data source from the end user, the message posting being related to a predefined monitored entity. The apparatus may also include a processor configured to parse the message contents and performing a natural language interpretation of the message contents, process the parsed message to determine the user's topic of interest, and generate a response to the message responsive to the user's topic of interest. The apparatus may also include a transmitter configured to send the response to the end user acknowledging the user's topic of interest.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" or "post" has been used in the description of embodiments of the present invention, the invention may be applied to many types of network data, such as packet, frame, datagram, etc. For purposes of this invention, the term "message" and the term "post" also includes packet, frame, datagram, and any equivalents thereof. Furthermore, while certain types of messages and signaling are depicted in exemplary embodiments of the invention, the invention is not limited to a certain type of message and/or post, and the invention is not limited to a certain type of signaling.

Example embodiments of the present invention include a natural language (NL) parsing system that derives interpretation out of a text string. For instance, the parsing system may use NL processing to determine a user's intended purpose from a text string, and the most appropriate response to the text string, then respond to the text string in accordance with a particular topic that a customer was commenting on or providing references to within the context of his or her existing comments.

Figure 1:
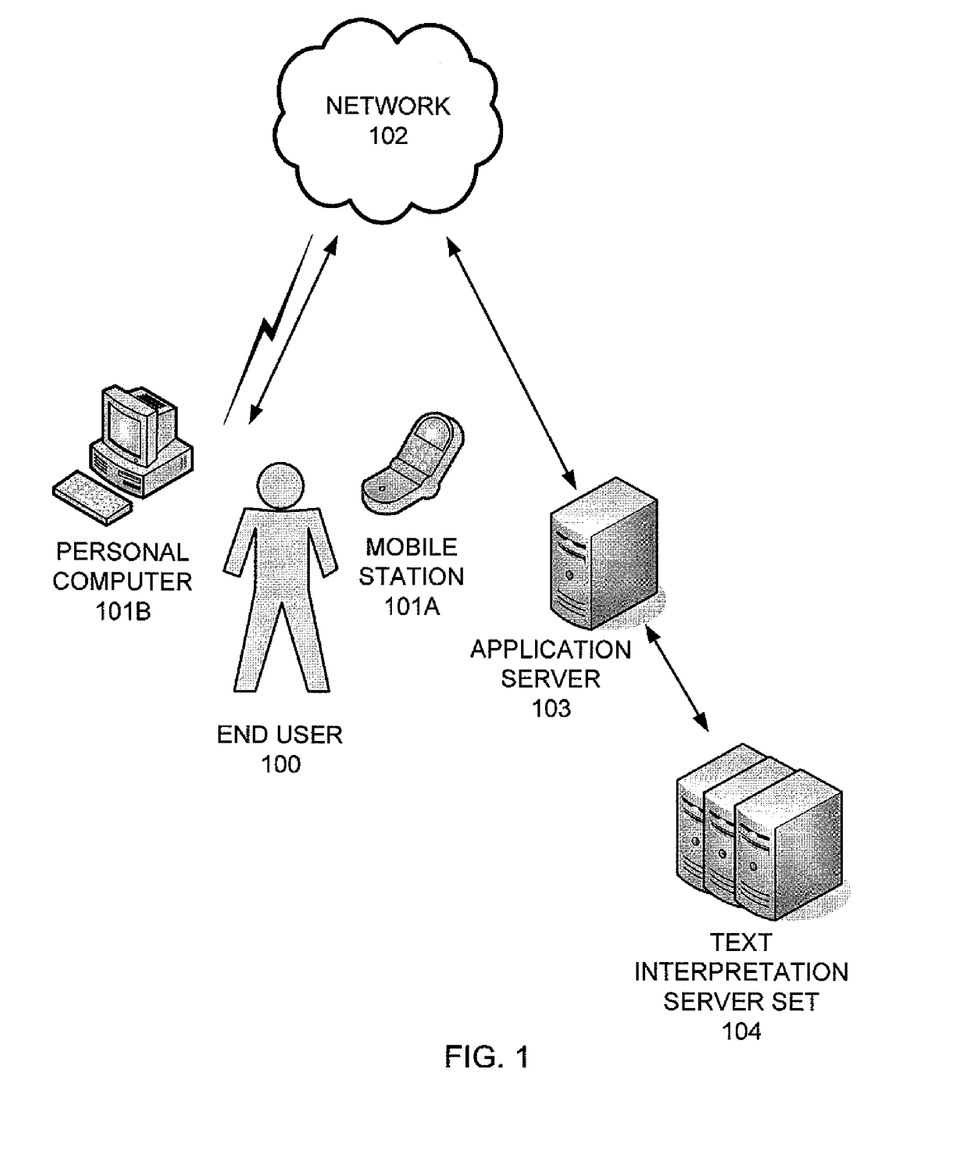
FIG. 1 illustrates an example network configuration according to example embodiments of the present invention

FIG. 1 illustrates an example communication network according to example embodiments of the present invention. Referring to FIG. 1, an end user 100 is operating a mobile station 101A or a personal computer 101B which is communicating wirelessly with a communication network 102, which may be the Internet or a private communication network. Alternatively, the end user 100 is operating a desktop personal computer (PC) that is communicating via a wired or wireless medium with a communication network 102. On the receiving end of the communication network is an application server 103, which operates to provide an application accessible to the end user via his or her mobile station 101A or desktop 101B. A text interpretation server or server set of multiple servers 104 provides a text interpretation application or engine that interprets the end user's text posts, and provides the interpreted text to the application server 103.

The user may be posting comments to a social networking webpage or site in response to a survey and/or freely with reference to a recent interaction the user has experienced. In operation, the communication network of FIG. 1 processes a user initiated post or message initiated by the end user 100. The message or post may be sent in a free-format without any added software flags, parameters, symbols or other data that may be used to interpret the text and/or designate a particular data field, etc. The message or post may be sent across a cellular or wireless communication network 102 and monitored by a remote application server 103. Certain text messaging or posting protocols may be used, such as, mobile SMS, MMS, IM, or any other free format text application.

According to one example, a user may initiate a new posting, such as a facebook "wall" post or Twitter "tweet", such as "The new tablet from company XYZ looks cool. Has anyone tried it?" Prior to entering such an example textual post, the user may first initiate a text session by entering a short code or number, email address, IM screen name or other input text message that indicates the identity of the user which provides the monitoring application server with the capability to confirm the user's facebook or Twitter identity.

The end user's message(s) or post(s) will be transmitted from the user's mobile station or desktop 101 across the network 102. The communication link may include transferring information over communication links, such as wireless networks (e.g., GSM, CDMA, 3G, 4G, etc.), wireline networks (e.g., landline telephony), Internet, satellite/cable networks, or, any other data medium using standard communication protocols.

According to another example, the message(s) or post(s) sent and/or received by the end user 100 may be received and processed by a third party company via an automated application that is setup to receive the messages and process the received information. The third party may provide a service to process and post the received message or post. The third party company and/or other entities setup to receive the message(s), may provide an automated application that will respond to the end user 100 with a textual message (e.g. "confirmation", a question, or other message type). The automated application will communicate textually in a turn-taking mode of operation by sending text messages to the user until the necessary information is received.

Figure 2:
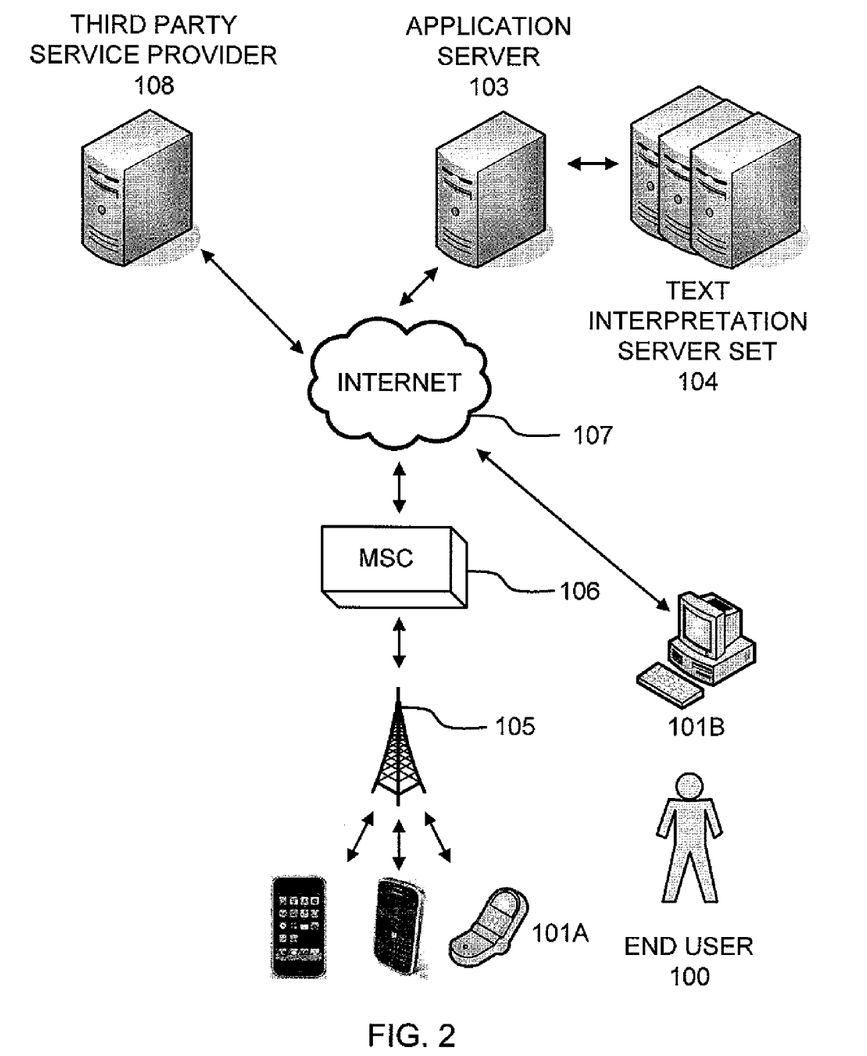
FIG. 2 illustrates another example network configuration according to example embodiments of the present invention.

FIG. 2 illustrates another example network configuration according to example embodiments of the present invention. Referring to FIG. 2, the end user 100 may have access to any mobile station 101A or desktop PC device 101B, such as, a cell phone, Blackberry®, Iphone®, or other type of smartphone, desktop or laptop communication device. The mobile station 101A or desktop device 101B may be used to communicate to a base station 105 via a wireless communication signal, which, in turn, communicates to a regional mobile switching center (MSC) 106. The MSC 106 will relay the text message across the Internet 107 to a text message application server 103, which may forward the text message to a text message interpretation server set 104 so the message may be normalized and processed to interpret the user's free form text information.

In addition to the monitoring application server 103 and the text interpretation server set 104, the third party site server 108 may have its own form of authentication and/or text processing application server. In one scenario, the user's message or post may be sent to the third party server 108 for posting. Once posted, the monitoring application server 103 will scan the posting to determine if it matches any of the company's monitoring criteria based on keywords, areas of interest, or emotion-based user postings. If there is a match, the user's post may then be processed to determine the user's topic (i.e., customer service complaint, product inquiry, etc.).

The automated message monitoring and response application platform may provide an increased availability of information, services, and/or communication systems that are currently only available via the Internet, live agents or automated phone systems (e.g. DTMF phone dialing, speech recognition, etc.). Not being bound by a computer or voice-based phone session, the end users would have access to such a communication platform anywhere they receive wireless connectivity via their mobile station.

The message or post interpretation engine set 104 may receive the message or post and perform normalization to separate keywords from other free-form textual words. The extracted keywords may, in turn, be used for two main purposes. First, if the message or post contains information relevant to the company performing the monitoring, the extracted information will be added to the monitoring statistics. For example, such information might reflect how many times the company has been mentioned in messages or posts or how many positive or negative comments have been detected. Secondly, the message or post interpretation will be checked to determine if it meets an automated response generation criteria. If yes, the post will be passed on to the response generation procedure, as illustrated as part of FIG. 3B. Example response generation criteria would be either a response to a complaint or a product comment/inquiry.

A normalization procedure may be implemented to reformat the received text. Normalization may format the received text into a format that is recognizable by the text message interpretation engine 104. The normalization procedure may be configured to reformat certain text shortcuts, such as L8=later, lol=laugh out loud, thx=thanks, wanna=want to, want 2=want to, etc. End users would not be bound by any particular rules of communicating during these text-based automated communication sessions. For instance, the end users can communicate using their normal texting methods and behaviors. The application will receive the messages and/or posts, interpret them, and thus the user may be free to create text messages for anything they wish to communicate.

According to example embodiments of the present invention, the response application will "normalize" text strings retrieved from user postings to compensate for common texting colloquialisms and abbreviations. In addition, the application may derive meaning from the end user's text string and respond accordingly in an effort to resolve the end user's needs. End users 100 would have the ability to contact companies and other entities via free format text sessions. The purpose of these sessions may be to part with information and/or sentiments (e.g. a complaint, a product review, etc.) and/or obtain information using a texting technology exclusively, or using some combination of a texting technology, such as, mobile SMS, MMS, IM, or any other free format text application.

In one example, the end user 100 may be posting sentiments about a recent product purchase he or she has made to Facebook®. In particular, he/she might be complaining about the difficulty of a particular function of the recently purchased product. The end user 100 may initiate a messaging session with the application server of the product's company service center by entering a short code/number related to the product, along with personal information, such as email address, instant messaging (IM) screen name, any of which could identify the user and authenticate his or her credentials. This information may be specific to the user 100. The user may also be posting to a blog created by the company on their own website alongside a product registration webpage. The user's complaint may be subsequently detected by the application based on the application scanning the user's keywords for words of interest.

In another example, the user may post a comment on a company website or blog associated with the company. The user may be encouraged to post, at least initially, after product registration to review the user's feedback to ensure the user's satisfaction with the product's service or functionality. The response system may be setup to respond to all recently registered user's initial comments to provide a guaranteed first response to the user's comments. If the user is experiencing difficulties, the initial posting may be screened to determine whether an automated response would be sufficient to answer the user's questions. If not, the next comment may trigger an automatic live agent request who may attempt to contact the user directly to ensure the problem is resolved.

Figure 3A:
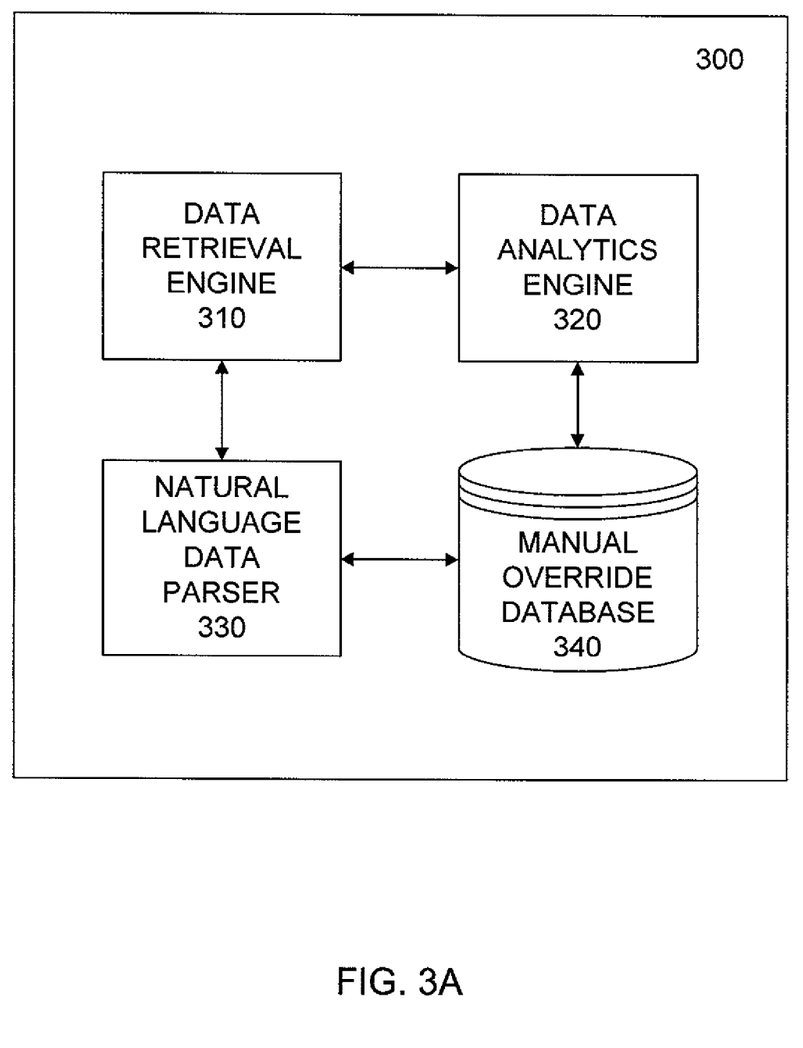
FIG. 3A illustrates an example data retrieval and processing system configured to retrieve user data from social networking data sources according to example embodiments of the present invention.

FIG. 3A illustrates an example message processing system, according to example embodiments of the present invention. Referring to FIG. 3A, the message processing system 300 may be one or more computing devices configured to process the user's text posts and determine the relevance of the user's message postings. For example, the processing system 300 may include a data retrieval engine that is configured to retrieve user comments posted on a social networking site or other user accessible information sharing entity. The data retrieval engine 310 may be setup to search for user information based on predefined user credentials, user name, address, phone number, demographic information, etc., that are provided as input to the data retrieval engine 310. Next, the data retrieval engine 310 may submit a query to a social networking website or other popular information sharing sites to screen for product specific words included in the user's previous postings.

The data retrieval engine 310 is driven by the data analytics engine 320, which monitors user's behavior over time and identifies the user submitted information posted on social networking websites and other data source locations. Once the user's postings are identified and the words are located and extracted from the postings, the natural language data parser engine 330 may then compare the words extracted from the data retrieval engine 310 to predefined data filtering criteria established for a particular user or a particular product, etc. The data filtering criteria may also seek to determine whether a user is satisfied, unsatisfied or has a question that can be answered by automated responses, or whether a live agent must review the user comments to determine if the user's disposition. A manual override database 340 may be used to override invalid interpretations of user comments or false word interpretations. This database may provide alternative responses to user's comments, which may be generated automatically or with the assistance of a live agent.

According to other example embodiments of the present invention, the end user 100 may be typing a free format post message describing their desire to learn more about a particular tablet computing device recently purchased. When the end user 100 completes their message, it is sent to the third party service provider (i.e. Facebook®), which, in turn, will post it in the appropriate public locations. The monitoring application server 103 would detect the posting and process it as well. If the monitoring application server 103 detects that the posting is related to the monitoring company, it will check if the posting matches one of the predefined response criteria. In this example, an auto-generated response would be generated based on the post with some recent reviews of the tablet by other people together with a special discount if the end user purchases this tablet within the next seven (7) days.

According to further example embodiments of the present invention, the end user 100 may be complaining about a poor service quality he or she has experienced the previous day. In that case, an automated response would be sent out to the end user 100 with an apology for the poor experience, and a promise to investigate and also a coupon for one of the company's products, etc.

Figure 3B:
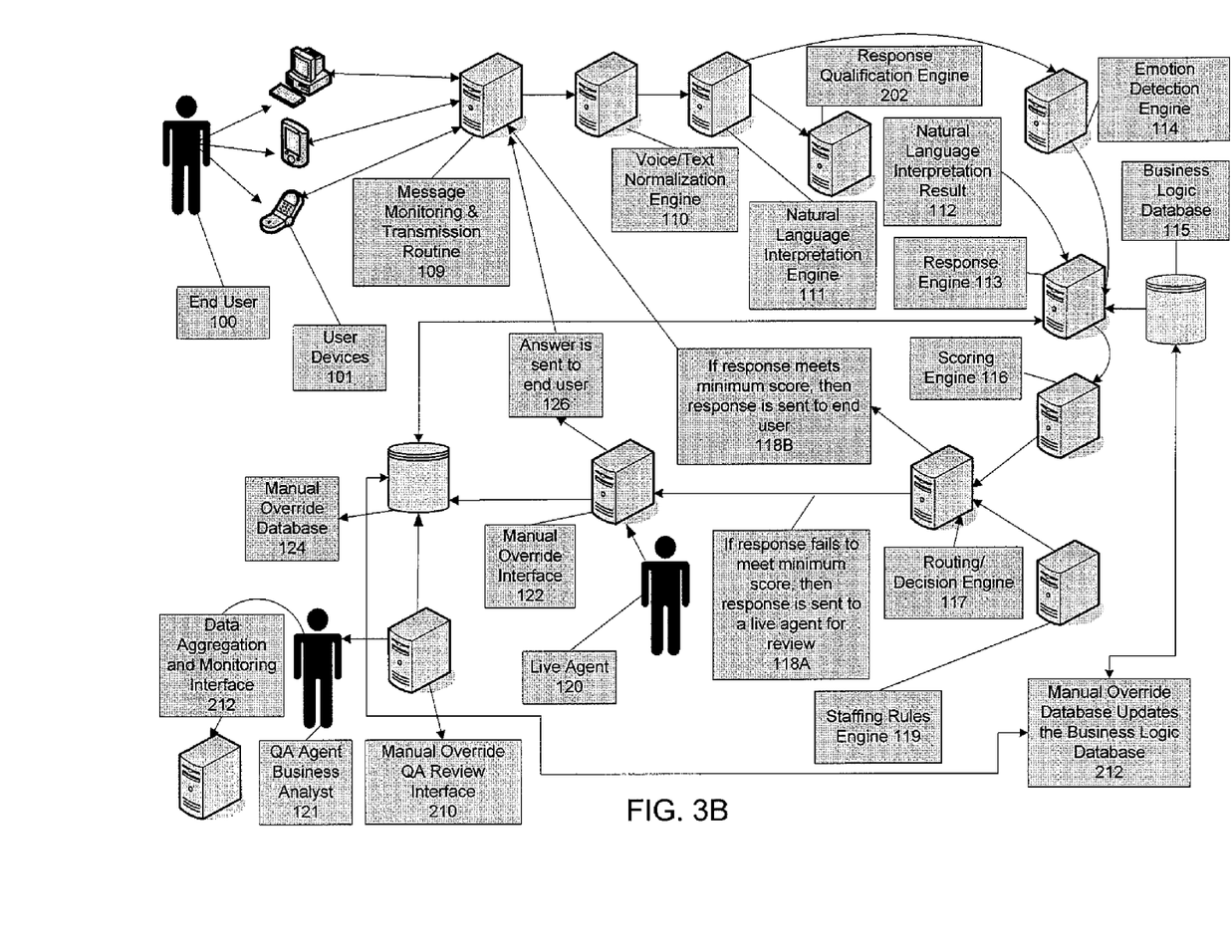
FIG. 3B illustrates the core logic flow of operations within an example communication network according to example embodiments of the present invention.

FIG. 3B illustrates a communication system according to example embodiments of the present invention. Referring to FIG. 3B, an end user 100 operates a user device 101 to communicate across the Internet to a social network server. This communication, once posted, will be reviewed and processed by the message processing system of FIG. 3A. The message may be monitored by the message monitoring and transmission routine engine 109. The user devices 101A may include any computing device, handheld computing device or cellular communication device capable of communicating voice, data, and in particular, a post. Or, may instead be a personal computer device 101B that communicates directly to the Internet bypassing the cellular network.

As stated above, messages transmitted and sent from the end user 100 are processed by a message monitoring and transmission routine 109. This processing routine may be part of a larger routine, which is part of a software application operating on a computing platform. It is important to note that all of the computing devices illustrated in FIG. 3B may be consolidated into any number of computing devices that are configured to execute the operations, algorithms and procedures described below. Assuming the message posted by the user included at least one of spoken words or text, those words can be processed and managed by a natural language (NL) text normalization engine 110.

All reviewed messages or posts will initially be processed by the text normalization engine 110 which will convert messages or posts having acronyms into standard, normalized text for further processing. The normalized text from the previous operation will then be provided to the natural language interpretation engine 111, which will employ robust parsing and one or more classifier algorithms in order to determine one or more "N" pre-defined results. It is possible that a message or post contains several different topics. In that case, the natural language interpretation engine 111 will assign multiple results to the message.

Within the natural language interpretation engine 111 may be a parser that provides class-based sub-grammars and name-entity detection algorithms, which will also be applied in order to fill necessary data elements associated with a given result. For example, if the processed message is about someone inquiring about a newly released tablet computing device, the result would be 'product inquiry', and the sub-tag product type='Tablet X100'. Combined together, the example result might appear as: [Result='product inquiry' conf='0.6123', Product Type='Tablet X100'], where 'conf' indicates the confidence coefficient of the natural language (NL) interpretation engine 111 of having picked the correct result category. This confidence is the confidence of the robust parsing or classifier output. The result of the interpretation 112 will be forwarded to a response qualification engine 202.

Predefined monitored entities, such as company names, product names, etc., must be established prior to monitoring the user postings to determine if the user is posting relevant information to the particular entity. The response qualification engine 202 has a set of qualification criteria used to determine which predefined response to generate. The criteria may be based on monitoring a company name that appears in the user message or post, and determining if the topic is of the nature that a response can be generated. Examples would include monitoring inquiries about company's products or complaints. If a message or post meets the qualification criteria, the natural language interpretation result of the message or post will be sent on to the response engine 113 and the emotion detection engine 114. If a response is met based on the qualification procedure, a response may then be generated to be sent to the end user 100.

The emotion detection engine 114 will use natural language processing algorithms for emotion detection, such as monitoring for occurrences and frequency of emotion related keywords and phrases (e.g., 'disappointed with service', 'complaint', or 'satisfied', 'great service', 'thanks').

The output of the emotion detection engine 114 will produce an emotion status from a predefined set of possibilities. The size of the predefined set may be implementation specific but will typically be less than 10. A common choice will be 'negative', 'neutral' and 'positive.' Next, the natural language interpretation result 112 may then be forwarded to a response engine 113.

The response engine 113 will interpret the natural language interpretation result 112 by matching the interpretation result type to a set of predefined response templates as well as sentence generation rules. The response templates may, for example, include a predefined email or SMS text templates that include various variables that need to be processed during the response generation process.

The response engine 113 will also take into account the result of the emotion detection engine 114 as well as relevant business logic from a business logic database 115. For example, if the person who sent the message is part of the contact center's database, then the database 115 will look up account information or past contact history for this person. The database 115 has predefined rules regarding which actions to take for different result types and including emotion status combinations. For example, a business rule might provide an offer for a coupon if the message result type='complaint' and emotion='negative', (i.e., the message is most likely a complaint about the delayed status of an order).

There will also be response value settings for the case that no matching response rules where found for a given result. In addition to generating the actual response text, the response engine 113 will also calculate a confidence score that describes the response engine's confidence in the response it generated. The score is based on how well the response matches the natural language interpretation result. For example, once the response has been generated, it is passed on to the scoring engine 116. The scoring engine 116 will then combine the confidence score from the interpretation engine 111 and the response engine 113 in order to calculate an overall confidence score that represents the possible correctness of both the original interpretation as well as the generated response.

The text interpretation system may query the current staffing status from the staffing rules engine 119. The staffing engine 119 provides data, such as, the current staffing status (e.g., number of agents online for a particular skill group) and data items, such as, the average hold time and/or queue length. The staffing engine 119 calculates a single staffing status based on all available data elements and combines that information with the message result record. For example, the staffing status values might include 'max automation', 'automated only high conf responses', etc. The set of staffing statuses could also be a simple range of numbers.

Once all automated actions have been completed and all information of the various operations has been encoded in the results record associated with the message, the completed results record may now be passed to the decision/routing engine 117. The decision/routing engine 117 measure the overall confidence score of the result and compares it with the staffing status provided from the staffing rules engine 119. A minimum score is looked-up and associated with each staffing status. If the response meets the minimum score for the current staffing status, then the auto-generated response is sent directly to the end user at operation 118B. If the overall confidence score is above the minimum threshold score level, then the response is sent to a live agent 120 to review the auto-generated response at operation 118A. Associating a minimum score for each staffing status may be helpful in the case of long hold times, since it might be preferable to send out as many automated responses as possible while taking the risks of occasionally sending an incorrect or partially incorrect response. However, if the call center is not busy, it is preferable to have live agents 120 review as many messages as possible.

The live agent 120 will review the response with the help of a manual override interface 122, which, in turn, is connected to a manual override database 124. If the agent 120 judges the response to be correct, it will then be sent to the end user 100. If the message has errors, the agent 120 will make the necessary corrections. Then, the correct message will be sent to the end user 100. At the same time, the correction information will be stored in the manual override database 124. All messages that are being sent out 126, both with and without agent review will be saved for review by quality assurance agents (QA agents) 121 via the manual override QA review interface 210.

The responsibility of the QA agents 121 will be to review the correctness of messages that have been sent out to the end user 100 without review by a live agent 120 as well as the messages that were corrected by a live agent 120. The review interface 210 will allow the QA agent 121 to sort the messages by a number of different criteria such as overall confidence score, result type, etc. The QA agent 121 will have the capability to correct all auto-generated messages. These corrections represent corrections to the rules and/or templates in the response engine 113 as well as the business logic database 115, which will be stored in the manual override database 124. In other words, the review agent 120 will view all the rules and templates that were involved in the response creation process in addition to the response that had been created. The corrections will include editing and/or adding to these displayed rules and templates.

On a regular basis, for example, nightly or weekly, the corrected and/or additional rules and templates will be sent to both the response engine 113 as well as the business logic database 115. This process ensures that even after its initial setup, the response engine 113 as well as the business logic database 115 are continually maintained and refined by a feedback loop from the manual override QA review interface 210. This process can continually add to the human or expert knowledge in both the response engine 113 as well as the business logic database 115 that is required to continuously increase the accuracy of responses over time, as the variability of the incoming messages from the end user 100 is large and also always changing over time. Additionally, the QA agent 121 also has the ability to update the information in the business logic database 115 and the response engine 113 directly in order to account for changes in business rules, contact center processes, product line-ups, service offerings, etc.

In addition to reviewing the auto-generated responses, the QA Agent 121 also has the responsibility of analyzing the data and statistics presented by the data aggregation and monitoring interface 212. This interface presents trending data, for example, how often the monitoring company is mentioned in the posts, which particular products those posts talk about, if a message or post contains the monitoring company name. This interface also provides data to the agent 121 for presenting trending data and statistics for the average emotion or emotion type distribution that was detected in the posts that mention the monitoring company.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components of FIGS. 1-3.

Figure 4:
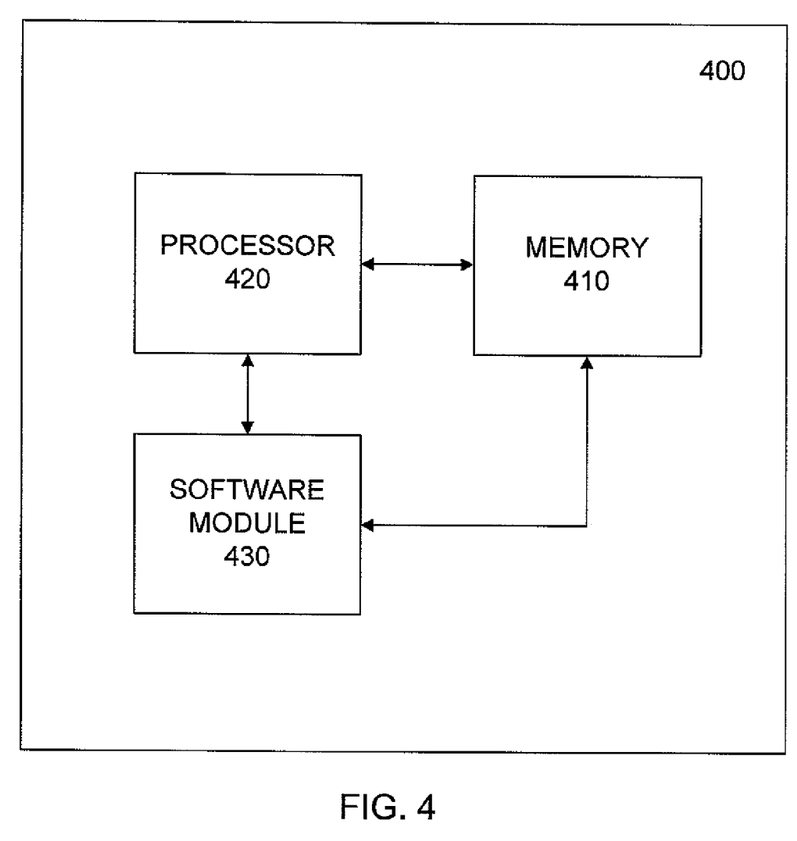
FIG. 4 illustrates a network entity that may include memory, software code and other computer processing hardware, and which may be configured to perform operations according to example embodiments of the present invention.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Figure 5:
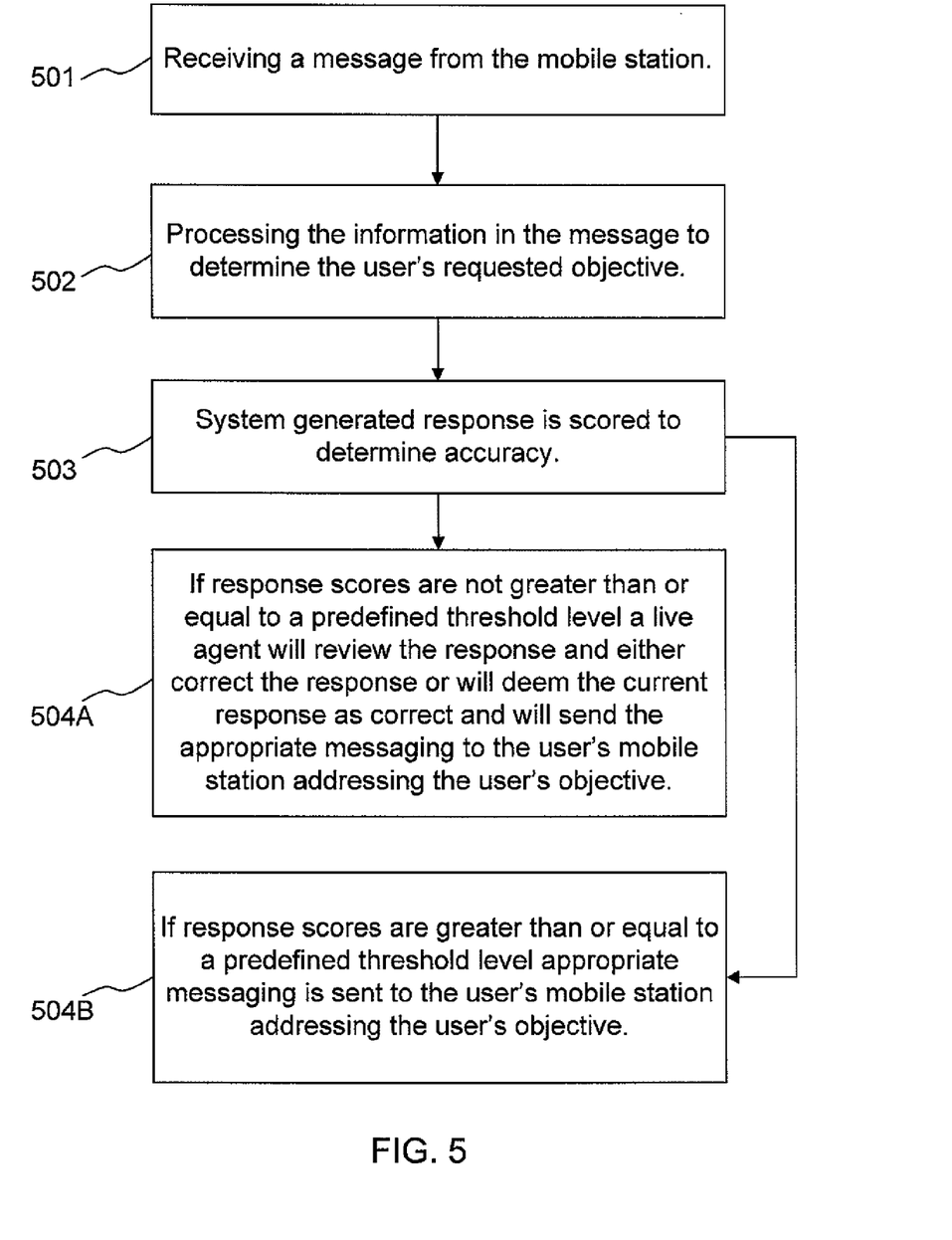
FIG. 5 illustrates a flow diagram of an example method of operation according to example embodiments of the present invention.

One example embodiment of the present invention may include a method of processing communications with a mobile station, as illustrated in the flow diagram of FIG. 5. The method includes the detection of a message that concerns the monitoring company at operation 501 and processing the information in the message to determine the user's objective, at operation 502. The system generated response is scored to determine accuracy, at operation 503. If the response scores are not greater than or equal to a predefined threshold level a live agent will review the response and either correct the response or will deem the current response as correct and will send the appropriate messaging to the user's mobile station addressing the user's objective, at operation 504A. If response scores are greater than or equal to a predefined threshold level appropriate messaging is sent to the user's mobile station addressing the user's objective, at operation 504B.

Figure 6:
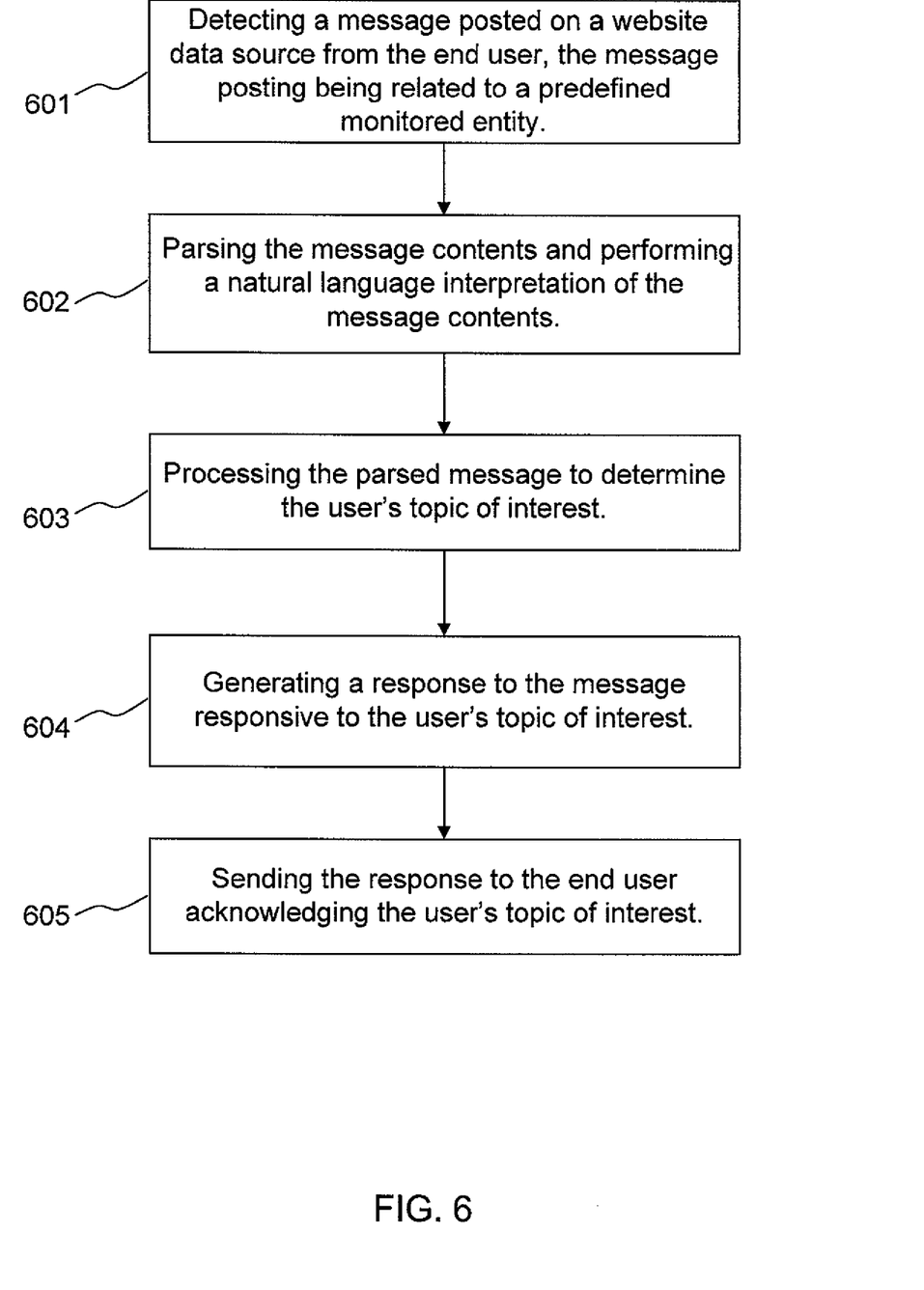
FIG. 6 illustrates another flow diagram of an example method of operation according to example embodiments of the present invention.

Another example embodiment of the present invention may include a method of processing a message originated from an end user, as illustrated in the flow diagram of FIG. 6. The method may include detecting a message posted on a website data source from the end user, the message posting being related to a predefined monitored entity, at operation 601. The method may also include parsing the message contents and performing a natural language interpretation of the message contents, at operation 602. The method may also include processing the parsed message to determine the user's topic of interest, at operation 603. The method may also include generating a response to the message responsive to the user's topic of interest, at operation 604. The method may also include sending the response to the end user acknowledging the user's topic of interest, at operation 605.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
    detecting, via a processor, a message posted on a website data source from an end user, the message posting being related to a predefined monitored entity;
    performing via the processor, a natural language interpretation of the message contents responsive to identifying the message posting being related to the predefined monitored entity;
    processing via the processor, the message to determine the user's topic of interest;
    generating via a processor, a response to the message responsive to the user's topic of interest; and
    sending, via a transmitter, the response to the end user;
    wherein the end user is identified by matching user specific information included in the message to pre-stored user specific information stored in a database.

2. The method of claim 1, further comprising calculating a confidence score representing a likelihood that the response is accurate prior to sending the response to the end user.

3. The method of claim 1, further comprising confirming the user's topic of interest has been addressed in the response.

4. The method of claim 1, further comprising notifying the predefined monitored entity of the user's topic of interest.

5. The method of claim 1, wherein the message includes an identification portion and a free format text portion and wherein the predefined monitored entity comprises at least one of a company name and a product name.

6. The method of claim 2, further comprising transmitting the response to a live agent for review if the calculated confidence score fails to meet a predetermined confidence score threshold prior to sending the response to the end user.

7. The method of claim 1, wherein the message is normalized to determine words of interest prior to fulfilling the user's topic of interest.

8. An apparatus, comprising:
    a message monitoring engine configured to monitor and detect a message posted on a website data source from an end user, the posted message related to a predefined monitored entity;
    a processor configured to:
        perform a natural language interpretation of the message contents responsive to the posted message being related to the predefined monitored entity;
        process the message to determine the user's topic of interest;
        generate a response to the message responsive to the user's topic of interest; and
    a transmitter configured to send the response to the end user;
        wherein the end user is identified by matching user specific information included in the message to pre-stored user specific information stored in a database.

9. The apparatus of claim 8, wherein the processor is further configured to calculate a confidence score representing a likelihood that the response is accurate prior to the response being sent to the end user.

10. The apparatus of claim 8, wherein the user's topic of interest is confirmed as being addressed in the response generated by the processor.

11. The apparatus of claim 8, wherein the processor is further configured to notify the predefined monitored entity of the user's topic of interest.

12. The apparatus of claim 8, wherein the message includes an identification portion and a free format text portion and wherein the predefined monitored entity comprises at least one of a company name and a product name.

13. The apparatus of claim 9, wherein the transmitter is further configured to transmit the response to a live agent for review if the calculated confidence score fails to meet a predetermined confidence score threshold prior to the response being sent to the end user.

14. The method of claim 1, wherein the message is normalized via the processor to determine words of interest prior to the user's topic of interest being fulfilled.

15. A non-transitory computer readable storage medium configured to store instructions that when executed cause a processor to perform:
    detecting a message posted on a website data source from an end user, the message posting being related to a predefined monitored entity;
    performing a natural language interpretation of the message contents responsive to identifying the message posting being related to the predefined monitored entity;
    processing the message to determine the user's topic of interest;
    generating a response to the message responsive to the user's topic of interest; and
    sending the response to the end user;
    wherein the end user is identified by matching user specific information included in the message to pre-stored user specific information stored in a database.

16. The non-transitory computer readable storage medium of claim 15, wherein the processor is further configured to perform calculating a confidence score representing a likelihood that the response is accurate prior to sending the response to the end user.

17. The non-transitory computer readable storage medium of claim 15, wherein the processor is further configured to perform confirming the user's topic of interest has been addressed in the response.

18. The non-transitory computer readable storage medium of claim 15, wherein the processor is further configured to perform notifying the predefined monitored entity of the user's topic of interest.

19. The non-transitory computer readable storage medium of claim 15, wherein the message includes an identification portion and a free format text portion and wherein the predefined monitored entity comprises at least one of a company name and a product name.

20. The non-transitory computer readable storage medium of claim 16, wherein the processor is further configured to perform transmitting the response to a live agent for review if the calculated confidence score fails to meet a predetermined confidence score threshold prior to sending the response to the end user.

* * * * *